United States Patent
Esposito et al.

(10) Patent No.: US 6,546,374 B1
(45) Date of Patent: Apr. 8, 2003

(54) APPARATUS FOR PROVIDING INSTANT VENDOR NOTIFICATION IN AN ELECTRONIC COMMERCE NETWORK ENVIRONMENT

(75) Inventors: Augustine N. Esposito; Gregg Garrett, both of Scottsdale, AZ (US)

(73) Assignee: Aether Systems, Inc., DE (US)

( * ) Notice: Subject to any disclaimer, the term of this patent is extended or adjusted under 35 U.S.C. 154(b) by 0 days.

(21) Appl. No.: 09/237,289

(22) Filed: Jan. 25, 1999

Related U.S. Application Data
(60) Provisional application No. 60/107,785, filed on Nov. 10, 1998.

(51) Int. Cl.$^7$ .......................... G06F 17/60; G06F 15/16
(52) U.S. Cl. .......................................... 705/27; 705/26
(58) Field of Search .................... 705/27, 26, 1; 455/453, 432, 438, 450, 452; 709/219, 217; 340/87, 61; G06F 17/60

(56) References Cited

U.S. PATENT DOCUMENTS

| | | | |
|---|---|---|---|
| 4,992,940 A | 2/1991 | Dworkin | 364/401 |
| 5,367,452 A | 11/1994 | Gallery et al. | 364/401 |
| 5,615,342 A | 3/1997 | Johnson | 395/227 |
| 5,652,789 A | 7/1997 | Miner et al. | 379/201 |
| 5,675,507 A | 10/1997 | Bobo, II | 364/514 |
| 5,712,979 A | 1/1998 | Graber et al. | 395/200.11 |
| 5,715,402 A | 2/1998 | Popolo | 395/237 |
| 5,717,860 A | 2/1998 | Graber et al. | 395/200.12 |
| 5,724,521 A | 3/1998 | Dedrick | 395/226 |
| 5,742,905 A | 4/1998 | Pepe et al. | 455/461 |
| 5,745,882 A | 4/1998 | Bixler et al. | 705/26 |
| 5,754,119 A * | 5/1998 | Deluca et al. | 340/825.21 |
| 5,758,328 A | 5/1998 | Giovannoli | 705/26 |
| 5,774,873 A | 6/1998 | Berent et al. | 705/26 |
| 5,794,207 A | 8/1998 | Walker et al. | 705/23 |
| 5,809,144 A | 9/1998 | Sirbu et al. | 380/25 |
| 5,812,769 A | 9/1998 | Graber et al. | 395/200.12 |
| 5,819,285 A | 10/1998 | Damico et al. | 707/104 |
| 5,826,242 A | 10/1998 | Montulli | 705/27 |
| 5,838,252 A | 11/1998 | Kikinis | 340/825.44 |
| 5,842,178 A | 11/1998 | Giovannoli | 705/26 |
| 5,845,283 A | 12/1998 | Williams et al. | 707/101 |
| 5,862,325 A | 1/1999 | Reed et al. | 395/200 |
| 5,870,549 A | 2/1999 | Bobo, II | 395/200.36 |
| 5,873,068 A | 2/1999 | Beaumont et al. | 705/14 |
| 5,878,416 A | 3/1999 | Harris et al. | 707/10 |
| 5,883,940 A | 3/1999 | Thornton | 379/88.2 |
| 5,884,270 A | 3/1999 | Walker et al. | 705/1 |
| 5,884,272 A | 3/1999 | Walker et al. | 705/1 |
| 5,890,138 A | 3/1999 | Godin et al. | 705/26 |
| 5,892,909 A | 4/1999 | Grasso et al. | 395/200.31 |
| 5,895,454 A * | 4/1999 | Harrington | 705/26 |
| 5,914,472 A | 6/1999 | Foladare et al. | 235/380 |
| 5,936,547 A | 8/1999 | Lund | 340/825.44 |
| 5,940,806 A | 8/1999 | Danial | 705/26 |

(List continued on next page.)

FOREIGN PATENT DOCUMENTS

| | | | | |
|---|---|---|---|---|
| JP | 07302287 A | * | 11/1995 | G06F/19/00 |
| WO | WO 98/34187 | * | 8/1998 | G06F/17/60 |

Primary Examiner—Cuong H. Nguyen
(74) Attorney, Agent, or Firm—Wilmer Cutler & Pickering

(57) ABSTRACT

According to the invention, an apparatus for providing real-time notification of purchaser requirements in a heterogeneous network environment is provided. The heterogeneous network environment can include a public packet switched network, such as the Internet, and a wireless network, such as a plurality of pagers. Select embodiments include a plurality of wireless terminals in communication with the wireless network to receive real-time notification of a purchaser's requirements. At least one vendor computer is part of the apparatus. The vendor computer has one or more databases for storing information about products and services in a product database, and a customer database, for storing information about customers. A plurality of client computers is also included. The client computers enable users to interact with the system to learn about and express interest in products and services.

38 Claims, 4 Drawing Sheets

U.S. PATENT DOCUMENTS

| | | | | |
|---|---|---|---|---|
| 5,948,059 | A | 9/1999 | Woo et al. | 709/206 |
| 5,951,638 | A | 9/1999 | Hoss et al. | 709/206 |
| 5,959,543 | A | 9/1999 | LaPorta et al. | 340/825.44 |
| 5,960,404 | A | 9/1999 | Chaar et al. | 705/8 |
| 5,963,915 | A | 10/1999 | Kirsch | 705/26 |
| 5,970,472 | A | 10/1999 | Allsop et al. | 705/26 |
| 5,971,273 | A | 10/1999 | Vallaire | 235/381 |
| 5,974,300 | A | 10/1999 | LaPorta et al. | 455/31.2 |
| 5,974,406 | A | 10/1999 | Bisdikian et al. | 707/1 |
| 5,978,776 | A | 11/1999 | Seretti et al. | 705/26 |
| 5,978,842 | A | 11/1999 | Noble et al. | 709/218 |
| 5,983,238 | A | 11/1999 | Becker et al. | 707/104 |
| 5,987,500 | A | 11/1999 | Arunachalam | 709/203 |
| 5,991,739 | A | 11/1999 | Cupps et al. | 705/26 |
| 5,995,597 | A | 11/1999 | Woltz et al. | 379/93.24 |
| 5,995,943 | A | 11/1999 | Bull et al. | 705/14 |
| 5,999,912 | A | 12/1999 | Wodarz et al. | 705/14 |
| 6,006,201 | A | 12/1999 | Berent et al. | 705/27 |
| 6,014,429 | A | 1/2000 | LaPorta et al. | 379/88.15 |
| 6,014,644 | A | 1/2000 | Erickson | 705/37 |
| 6,021,397 | A | 2/2000 | Jones et al. | 705/36 |
| 6,021,433 | A * | 2/2000 | Payne et al. | 709/219 |
| 6,026,374 | A | 2/2000 | Chess | 705/26 |
| 6,029,141 | A | 2/2000 | Bezos et al. | 705/27 |
| 6,029,174 | A | 2/2000 | Sprenger et al. | 707/103 |
| 6,031,821 | A * | 2/2000 | Kalkunte et al. | 370/414 |
| 6,032,130 | A | 2/2000 | Alloul et al. | 705/27 |
| 6,032,147 | A | 2/2000 | Williams et al. | 707/101 |
| 6,032,195 | A * | 2/2000 | Reber et al. | 709/245 |
| 6,034,970 | A | 3/2000 | Levac et al. | 370/466 |
| 6,035,104 | A | 3/2000 | Zahariev | 395/200.33 |
| 6,038,549 | A | 3/2000 | Davis et al. | 705/35 |
| 6,041,239 | A * | 3/2000 | Reed et al. | 455/453 |
| 6,041,308 | A | 3/2000 | Walker et al. | 705/14 |
| 6,041,310 | A * | 3/2000 | Green et al. | 705/27 |
| 6,041,314 | A | 3/2000 | Davis | 705/41 |
| 6,047,053 | A | 4/2000 | Miner et al. | 379/201 |

OTHER PUBLICATIONS

Rafter, Auto–by–tel your online auto source, from St. Louis Post Dispatch, printed Aug. 21, 1996.*

From URL http://carpoint.msn.com/home/new.asp, MSN CarPoint—Home, printed Apr. 19, 2000.*

From URL http://www.carclub.com/, Carclub.com—"You are not alone", copyright 2000.*

Welles, Burning down the house, from Inc., v19 n11 p66(8), (Dialog(R) file 148).*

From The Daily News of Los Angeles, Medianews to help roll out online car–shopping service, section: Business, p. B1, Sep. 10, 1998.*

Szadkowski, from The Washington Times, GM Web site taps into demand for online car–shopping services, section: Business, p. B1, May 04, 1998.*

Orenstein, from the Times Union, Online car market expands its reach, section: Business, Nov. 15, 1996.*

Manning, from the Courier–Journal (Louisville, KY), Online auto sales rid shoppers of hassle—and pushy salesmen, section: SCENE HIGH TECH, p. 2S, Aug. 10, 1996.*

From Dialog(R) file 9, Auto–by–tel updates dealers, Automotive News, n5730 p. 20, Sep. 08, 1997.*

From Dialog(R) file 9, New buying service relieves dealers of inventory updating, Automotive News, n5730 p. 18, Sep. 08, 1997.*

Securities and Exchange Commission Form S–1 for Autobytel Com Inc., Mar. 25, 1997, p. 1–220.*

Press Release Autobytel.com, "Autobytel.com puts representatives in the field, becoming first onlie buying service to localize dealer support services", Nov. 5, 1998.*

Press Release Autobytel.com, "Autobytel.com's New Web Design Makes Buying a Car even Easier", Dec. 9, 1997.*

Deborah Radcliff, "The Web Meets Auto World–Will it Kill the Flimflam Man?", Software Magazine, Dec. 1997, p. 81–85.*

"Auto–By–Tel wins with Educated Customers and Low Prices", Interactive Marketing News, Oct. 18, 1996.*

Angela Navarrete, "Driving a Hard Bargin", PC World, Aug. 1998, p. 247–250.*

Natalie Engler, "Emerging Enterprise Online Opportunity", Informationweek, Jan. 11, 1999, p. 89.*

Sheila Muto, "Firms Battle for On–line Car Buyers", Wall Street Journal, Feb. 25, 1998, p. CA1.*

The Theater NavComm Concept, L.B. Jocic, IEEE pp. 217–222.

A System To Distribute Real–Time Operational Data Utilizing Existing Public Communications Infrastructure, Robert H. McClanahan, Arkansas Electric Cooperative Corporation, pp. C6–1–C6–8.

Abstract, Paging the Mercury Way, D. Burton, Business Equipment Digest, Jan. 1989, pp. 22.

Abstract, Anywhere, Anytime: The Wireless Office of Today, R. Friedman, Office, vol. 118, No. 2, Aug. 1993, pp. 8–9, 52.

Abstract, Interactive Systems: Linking Sensors with Alphanumeric Pagers, D. Meares, Communications, vol. 31, No. 10, Oct. 1994, pp. 38–40, 42.

Abstract, Highly Automated Low Personnel System Administration in a Wall Street Environment, H. Kaplan, Proceedings of the Eighth Systems Administration Conference (LISA VIII). USENIX Assoc. 1994, pp. 185–189, Berkeley, CA.

Abstract, Personal Communication in Traditional Cellular Networks, El. Neuer, SPIE–Int. Soc. Opt. Eng. Proceedings of SPIE—The International Society for Optical Engineering, vol. 2602, 1996, pp. 184–195.

Abstract, Can New Pagers Improve Your Sales?, T. Dellecave, Jr., Sales & Marketing Management, vol. 148, No. 1, Jan. 1996, pp. 92–93.

Abstract, Business on Call, J. DeJong, Inc., vol. 18, No. 17, 1996, pp. 112–114.

Abstract, A Speaker Identification Agent, L.E. Julia, L.P. Heck, A.J. Cheyer, Audio–and Video–Based Biometric Person Authentication. First International Conference, AVBPA '97. Proceedings. Springer–Verlag. 1997, pp. 261–266. Berlin, Germany.

Abstract, Are Your Customers Being Served? SS Rao, Inc., vol. 19, No. 13, 1997, pp. 82–83.

Abstract, Implementing Telecommunications Value Added Services to Achieve Universal Service Objectives in Africa, B. Hamersma, Africon '96. Incorporating AP–MTT–96 and COMSIG–96. 1996 IEEE AFRICON, $4^{th}$ AFRICON Conference in Africa. Electrical Energy Technology, Communication Systems, Human Resources (Cat. No. 96CH35866). IEEE. Part vol. 2, 1996, pp. 804–809, vol. 2, New York, NY.

Abstract, Detecting Attacks on Networks, C. Herringshaw, Computer, vol. 30, No. 12, Dec. 1997, pp. 16–17.

Abstract, Automating 24*7 Support Response to Telephone Requests, P. Scott, Proceedings of the Eleventh Systems Administration Conference (LISA XI). USENIX Assoc. 1997, pp. 27–35. Berkeley, CA.

Abstract, The Physical Infrastructure for Electronic Commerce in Developing Nations: Historical Trends and the Impact of Privatization. A. Dutta, International Journal of Electronic Commerce, vol. 2, No. 1, Fall 1997, pp. 61–83.

Abstract, Productivity and Quality Improvements in Health Care Through AirBoss Mobile Messaging Services, P.J. Shah, R. Martinz, E. Gooney, Medicine Meets Virtual Reality. Global Healthcare Grid. IOS Press. 1997, pp. 583–590, Amsterdam, Netherlands.

Abstract, Universal Enhanced Services, D.f. Hemmings, 19th Annual Pacific Telecommunications Conference. PTC '97. Pacific Telecommun. Council, 1997, pp. 463–467. Honoloulu, HI.

Abstract, The Mobile Intranet, B. Emmerson, Byte, vol. 23, No. 5, Ma 1998, pp. IS40/15–19.

Abstract, Bringing the Web to the World: Adding Web Functionality to Almost Anything, B. Kowalski, S. Wingard, Proceedings of the Embedded Systems Conference Spring. Miller Freeman. Part vol. 1., 1998, pp. 251–264 vol. 1. San Francisco, CA.

Abstract, Distributed Paging, Y. Bartal, Online Algorithms. The State of the Art. Springer–Verlag. 1998, pp. 97–117, Berlin, Germany.

Abstract, Virtual Tele–Information for Rural Community. An Approach to Bring Powerful Telecommunication for Rural Community, B. Achmad Sofyan, Global Networking '97. 21st Century Communications Networks. Proceedings of the Global Networking '97 Conference. IOS Press. Part vol. 2, 1997, pp. 417–421 vol. 2 Amsterdam, Netherlands.

Abstract, Wireless IP—Less Work, More Applications, C.J. Mathias, Business Communications Review, vol. 29, No. 6, Jun. 1999, pp. 62–64, 66.

Abstract, Reliability, Costs and Delay Performance of Sending Short Message Service in Wireless Systems, H. Jiang, ICUPC '98. IEEE 1998 International Conference on Universal Personal Communications. Conference Proceedings (Cat. No. 98TH8384). IEEE, Part vol. 2, 1998, pp. 1073–1077 vol. 2, New York, NY.

Abstract, Pager Power Buyer's Guide, A. Stewart, What to Buy for Business, No. 221, Aug. 1999, pp. 6–24.

Abstract, Road–warrioring Made Easy Unified Mobile Communications, J. Gately, Communication News, vol. 36, No. 9, Sep. 1999, pp. 22, 24.

Abstract, Microsoft's BizTalk Framework Adds Messaging to XML. Proposed Framework for XML Schemas and Exchange of Data, M.A. Goulde, E–Business Strategies & Solutions, Sep. 1999, pp. 10–14.

Abstract, HMI Software Powers Diagnostics, G.A. Mintchell, Control Engineering, vol. 46, No. 7, Jul. 1999, pp. 67–68, 70, 72.

Abstract, Is Two–Way Paging the Way Forward? J. Couvas, Telecommunications (International Edition), vol. 33, No. 11, Nov. 1999, pp. 46, 48, 50.

Maile Carpenter, "How to Play the Bidding Game", Money, Fall 1998, p. 70–71.

Bob Williams, "Pick a Car, Name Your Price", Computerworld, Jul. 27, 1998, p. 45–46.

Ken Brack, "GM Buying Into Online Auctions", Industrial Distribution, Nov. 1998, p. 21, 34.

Clinton Wilder, "Online Auto Sales Pick Up, Transforming An Industry", Informationweek, Feb. 9, 1998, p. 73.

Ramin P. Jaleshgari, "Online Action Site Bids Well—Tam Group Helps Auto Auctioneer Copart Drive Up Revenue", Aug. 17, 1998, p. 49.

Abstract, "Honda to Start Internet Used Car Auctions", Nihon Keizai Shimbun, Jan. 9, 1998.

* cited by examiner

APPARATUS FOR PROVIDING INSTANT VENDOR NOTIFICATION IN AN ELECTRONIC COMMERCE NETWORK ENVIRONMENT

CROSS-REFERENCES TO RELATED APPLICATIONS

This application claims priority from the following U.S. Provisional Patent Application, the disclosure of which, including all appendices and all attached documents, is incorporated by reference in its entirety for all purposes:

U.S. Provisional Patent Application Ser. No. 60/107,785 Augustine Esposito entitled, "METHOD AND SYSTEM FOR PROVIDING VENDOR NOTIFICATION IN AN ELECTRONIC COMMERCE NETWORK ENVIRONMENT," filed Nov. 10, 1998.

The following commonly-owned copending applications are being filed concurrently, and are hereby incorporated by reference in their entirety for all purposes:

U.S. patent application Ser. No. 09/236,510 Augustine Esposito and Greg Garrett entitled, "METHOD FOR PROVIDING VENDOR NOTIFICATION MARKETING IN AN ELECTRONIC COMMERCE NETWORK ENVIRONMENT," and U.S. patent application Ser. No. 09/237,292 Augustine Esposito and Greg Garrett entitled, "METHOD AND SYSTEM FOR CONDUCTING REAL TIME ELECTRONIC COMMERCE,".

BACKGROUND OF THE INVENTION

1. Field of the Invention
2. Related Art

The present invention relates generally to electronic commerce systems, and specifically to providing real-time notifications to vendors of purchaser requirements in a heterogeneous network environment. The heterogeneous network environment can include a public packet switched network, such as the Internet, and a wireless network, such as a plurality of pagers. The wireless network can be packet switched or circuit switched.

We live in the information age. How prophetic the statement of a major computer manufacturer which said "It was supposed to be the atomic age, instead it has turned out to be the information age." Yet, few could foresee the rapid development of the Internet and its potential for creating virtual marketplaces for goods and services. Virtual marketplaces can make a large number of product advertisements available in a convenient manner, enabling users to preview products at little or no cost.

Presently, online network based sales systems require that purchasers conclude purchase and sale transactions online, without interaction with a merchant. These traditional approaches tend to focus on securing the payment mechanism so that the transaction can be concluded completely online. While there are perceived advantages, an inherent disadvantage to these systems is that the human element is lost. The user must enter information into a web page or other medium, press the mouse button or enter key and hope for the best. While suitable for small purchases, users understandably experience anxiety in trusting a major purchase to a completely automated system.

What is needed is a virtual marketplace system that incorporates the human element in the purchase and sale transaction.

SUMMARY OF THE INVENTION

According to the invention, an apparatus for providing real-time notification of purchaser requirements in a heterogeneous network environment is provided. The heterogeneous network environment can include a public packet switched network, such as the Internet, and a wireless network, such as a plurality of pagers.

Select embodiments include a plurality of wireless terminals in communication with the wireless network to receive real-time notification of a purchaser's requirements. At least one vendor computer is part of the apparatus. The vendor computer has one or more databases for storing information about products and services in a product database, and a customer database, for storing information about customers.

The apparatus also includes one or more client computers interconnected to the vendor computer by the public packet switched communications network. Each of the client computers is able to present to a user a plurality of product options and services from which the user can make a selection. Responsive to the users' input indicating a particular product from a menu, the client computer provides product information such as pictures, retrieved from the product database by the vendor computer over the public packet switched network. Then, the client receives from the user a purchase selection and prompts the user for user specific information, such as a name and an address. The client can then create a purchase request to be transmitted to the vendor computer over the public packet switched communications network.

The vendor computer is able to analyze purchase requests to determine the product and the proximity of vendors having the product to the user. Then, based upon the location information, the vendor computer can select from the product database one or more vendors, each being in close proximity to the user. The vendor computer can determine a wireless region and account information associated with each of the plurality of selected vendors in order to record information about the user in the customer database.

The apparatus transmits a message to the selected vendors via the wireless network based upon the wireless region and account information, in order to provide the real time notification. The apparatus can also send a confirmation message to the user over the public packet switched network to indicate that one of the selected vendors will contact the user in order to enter into a commercial transaction.

Numerous benefits are achieved by way of the present invention over conventional techniques. The present invention can provide a way to notify vendors of a prospective purchaser's product needs and preferences. The presently preferable embodiment can provide nationwide coverage. Many embodiments can provide in-building penetration of messaging. Seamless roaming and fast messaging are also made possible by virtue of the present invention. Embodiments can exhibit high reliability. Because vendors receive information about customer preferences in real time, the probability of a purchase and sale transaction being consummated can be greater than with conventional browsing techniques. These and other benefits are described throughout the present specification.

A further understanding of the nature and advantages of the invention herein may be realized by reference to the remaining portions of the specification and the attached drawings.

DESCRIPTION OF THE SPECIFIC EMBODIMENTS

System Overview

Figure 1:
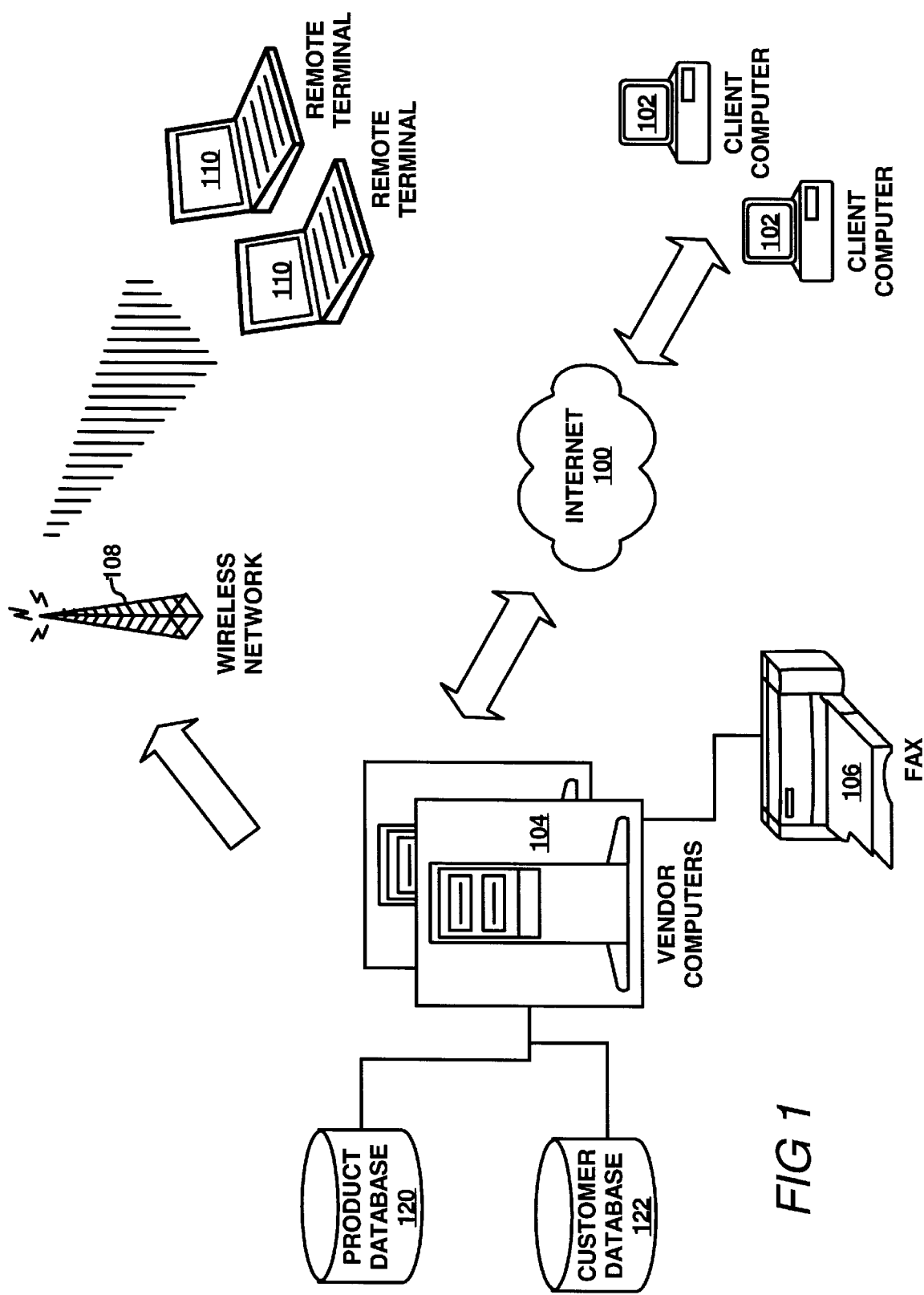
FIG. 1 is an illustration of a representative networking environment suitable for operating the apparatus according to an embodiment of the present invention.

FIG. 1 depicts a representative network environment in which the real time vendor notification apparatus of the present invention can be practiced. A public packet switched network 100, that interconnects plurality of client computers, such as client computer 102, with at least one vendor computer 104. Network 100 can be any public network commonly known by those of ordinary skill in the art, such as Ethernet, a LAN, WAN or ATM network, but in the presently preferable embodiment is the Internet.

Vendor computer 104 maintains a product database 120 that comprises available product or service offerings. Vendor computer 104 also maintains a customer database 122 that comprises customer identifications. Some embodiments will incorporate the product database 120 and customer database 122 on the same machine. Other embodiments separate the product database and the customer database.

Users interact with plurality of client computers 102 in order to view information about products stored in product database 120. This information is provided by vendor computer 104 using a Web page and CGI scripting. Providers of products and services place information into product database 120. Information about the users' product selections and preferences is entered by the user at the client computer 102 responsive to the product information provided by vendor computer 104 and displayed on client computer 102. Client computer 102 collects user responses and transmits this information to vendor computer 104 over network 100. Vendor computer 104 then selects based upon geographic location information, such as a telephone area code or postal code of the user, one or more vendors to receive information about the users' preferences for a particular product or service. This information comprises a vendor notification transmitted to the vendor. If any of the one or more vendors can complete a purchase and sale transaction with the user, the vendor can contact the user directly.

The present invention may be implemented using any one or a combination of public packet switched network topologies, such as IEEE 802.3 Ethernet, IEEE 802.5 Token Ring, ITU X.25, or serial (SLIP) protocols, for example. In the presently preferable embodiment, information is broadcast to a plurality of wireless terminals 110 using broadcast medium 108. Wireless remote terminal 110 may be a handheld Personal Data Assistant (PDA) device, laptop computer, palmtop computer, such as the PalmPilot®, made by 3Com, Inc., or the like. In a presently preferable embodiment, wireless remote terminal 110 is a RIM 950 Inter@active™ Pager unit made by Research In Motion, a company based in Waterloo, Ontario. The wireless remote terminal 110 is operable with the Mobitex® technology wireless networks made by Ericsson.

Figure 2:
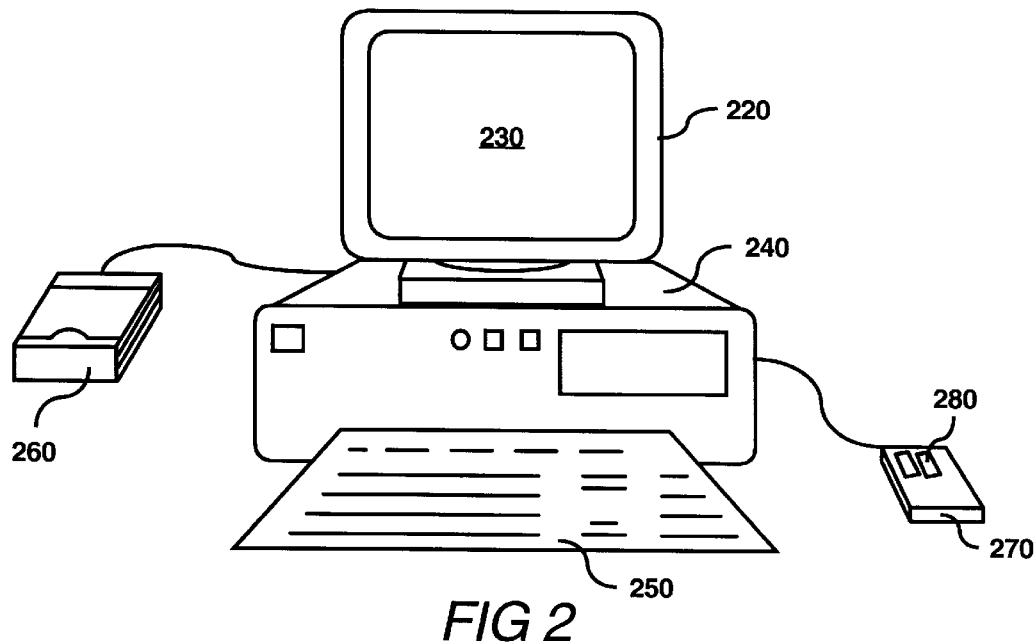
FIG. 2 is an illustration of a computing system according to an embodiment of the present invention.

FIG. 2 is an illustration of a representative computer system suitable for use as one of the client computers 102 and the vendor computer 104 according to a preferred embodiment of the present invention. FIG. 2 depicts but one example of many possible computer types or configurations capable of being used with the present invention. FIG. 2 shows computer system 210 including display device 220, display screen 230, cabinet 240, keyboard 250, a scanner 260, and mouse 270. Mouse 270 and keyboard 250 illustrate "user input devices." Other examples of user input devices are a touch screen, light pen, track ball, data glove, etc.

In a preferred embodiment, System 1 includes a Pentium® class based computer, running Windows® Version 3.1, Windows95® or Windows98® operating system by Microsoft Corporation. However, the method is easily adapted to other operating systems without departing from the scope of the present invention.

Mouse 270 may have one or more buttons such as buttons 280. Cabinet 240 houses familiar computer components such as disk drives, a processor, storage means, etc. As used in this specification "storage means" includes any storage device used in connection with a computer system such as disk drives, magnetic tape, solid state memory, bubble memory, etc. Cabinet 240 may include additional hardware such as input/output (I/O) interface cards for connecting computer system 210 to external devices such as a scanner 260, external storage, other computers or additional peripherals.

FIG. 2 is representative of but one type of system for embodying the present invention. It will be readily apparent to one of ordinary skill in the art that many system types and configurations are suitable for use in conjunction with the present invention.

Figure 3:
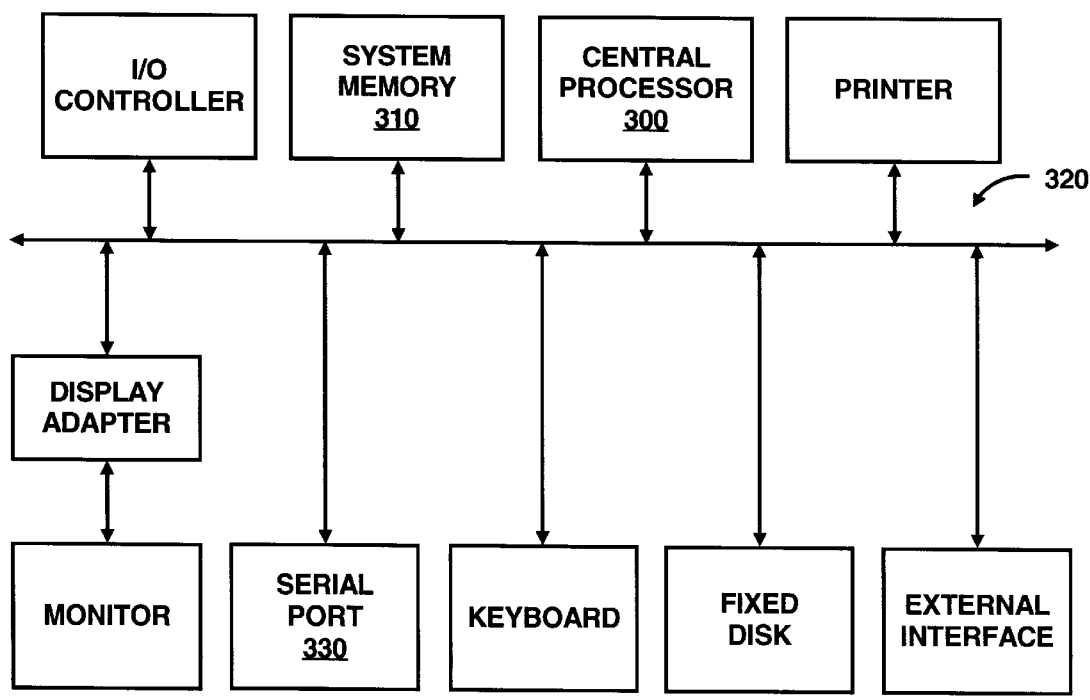
FIG. 3 is an illustration of basic subsystems of the computing system of FIG. 2.

FIG. 3 is an illustration of basic subsystems in computer system 210 of FIG. 2. In FIG. 3, subsystems are represented by blocks such as central processor 300, system memory 310, etc. The subsystems are interconnected via a system bus 320. Additional subsystems such as a printer, keyboard, fixed disk and others are shown. Peripherals and input/output (I/O) devices can be connected to the computer system by, for example serial port 330. For example, serial port 330 can be used to connect the computer system to a modem, a mouse input device, or a scanner. The interconnection via system bus 320 allows central processor 300 to communicate with each subsystem and to control the execution of instructions from system memory 310 or the fixed disk, and the exchange of information between subsystems. Other arrangements of subsystems and interconnections are possible. System Memory 310, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 4:
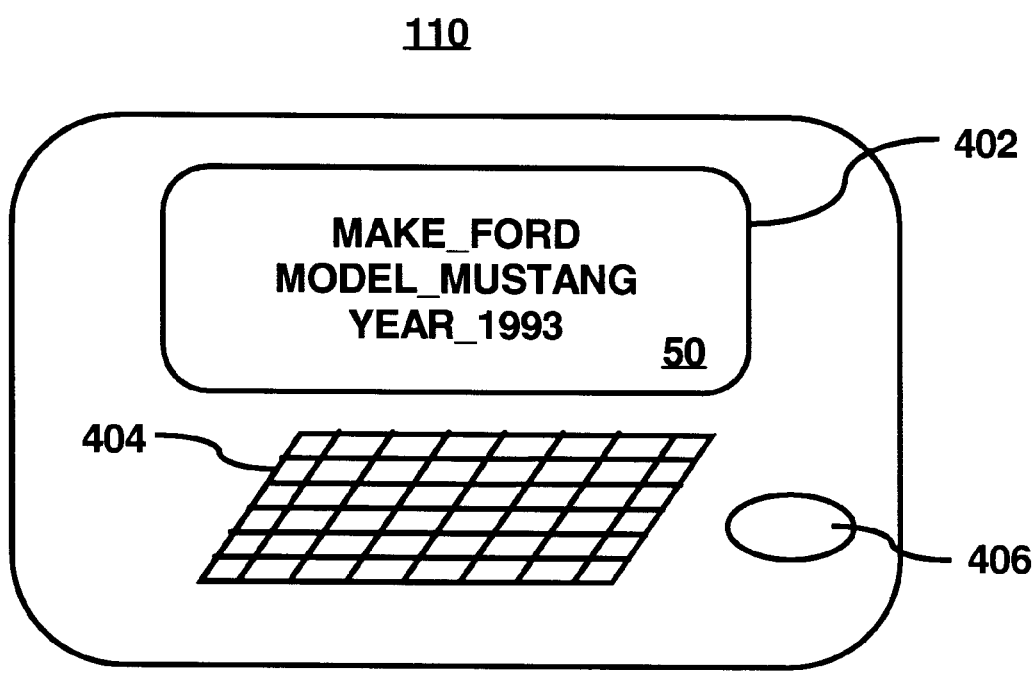
FIG. 4 is an illustration of a representative apparatus according to an embodiment of the present invention.

FIG. 4 is an illustration of wireless remote terminal 110 of FIG. 1. Wireless remote terminal may be a handheld Personal Data Assistant (PDA) device, laptop computer, palmtop computer, such as the PalmPilot®, made by 3Com, Inc., or the like. In a presently preferable embodiment, wireless remote terminal 110 is a two-way messaging communications unit operable with the Mobitex® technology wireless networks developed by Ericsson. Wireless Terminal 110 enables vendors to receive, originate and reply to messages using wireless communication network 108 in a palm-size unit. The presently preferable embodiment utilizes a 32-bit Intel386™ microprocessor coupled to a transmitter having a 2W capability and a high-efficiency receiver. The embodiment further provides wearable portability. FIG. 4 depicts wireless remote terminal 110 having a display area 402 in which a vendor notification message 50 is currently displayed. Display area 402 is preferably an LCD display having at least 8 lines of text with approximately 28 characters per line to facilitate displaying vendor notification messages. Back-lighting provides readability in areas of limited lighting. Terminal 110 has a 31 key Personal Computer style keypad and a roller wheel 406 that provide the end user merchant the ability to work with the vendor notification messages sent to the device.

Software Overview

Figure 5:
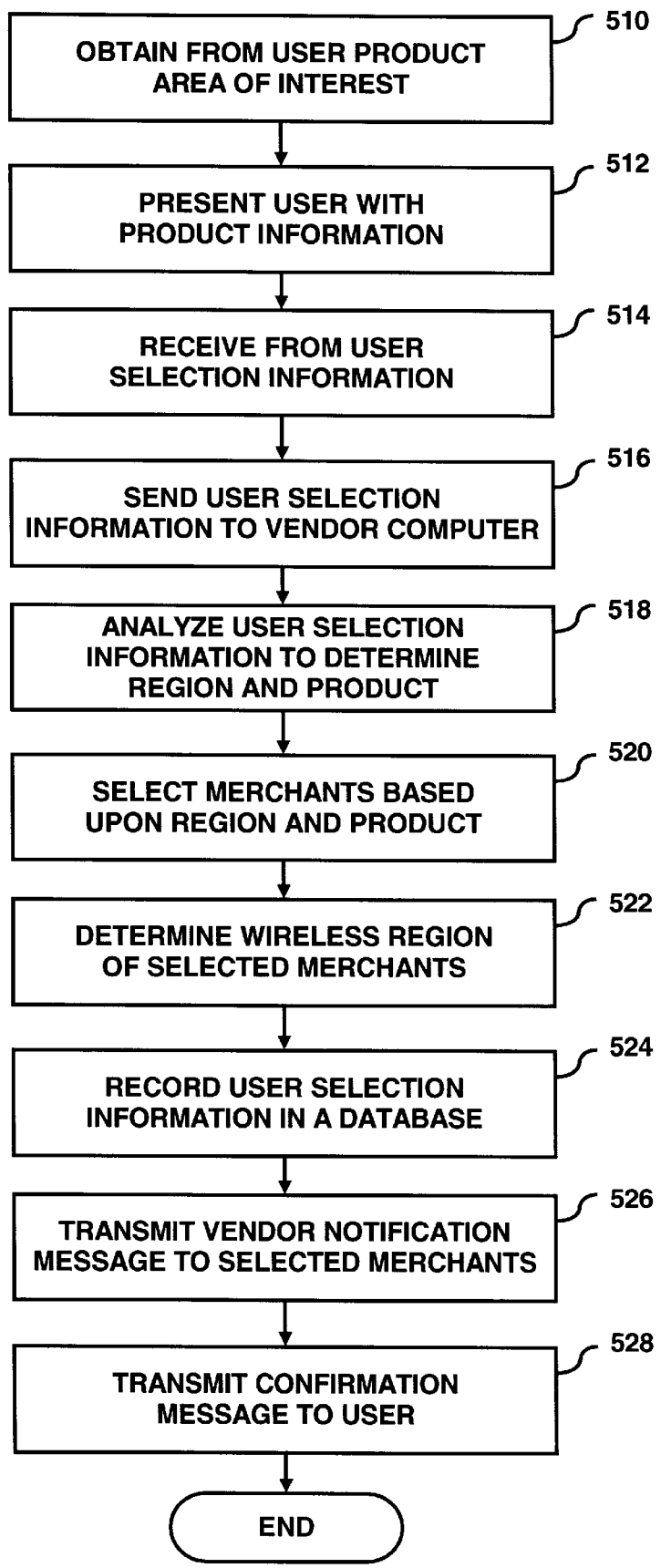
FIG. 5 is an illustration of a flowchart of simplified process steps according to an embodiment of the present invention.

FIG. 5 depicts a flowchart of simplified steps in a representative embodiment according to the present invention for providing real time notification to vendors. In a step 510, a user at one of the plurality of client computers is presented with a plurality of product options and services from which to make a selection. Then, in a step 512, responsive to user input indicating a particular product from a menu, the user is provided product information, including photographs, retrieved from the product database 120. In a step 514, a product selection and user specific information, including geographic information, is received from the user. In a step 516, a purchase request is transmitted to the vendor computer over the public packet switched communications network. Then, in a step 518, the purchase request is analyzed by the vendor computer to determine the product and proximity information of the user. Incoming information is examined to determine proximity information such as the area code or postal code of the user. This information determines which wireless service provider region and terminal accounts can be selected to receive vendor notification. In a step 520, based upon the proximity information, a plurality of vendors is selected from the product database 120, each of the vendors being in close proximity to the user. In a step 522, a wireless region and account information associated with each of the plurality of selected vendors is determined. Next, in a step 524, information about the user is recorded in the customer database 122. In a step 526, vendor notification message 50 is transmitted to each of the selected vendors via the wireless network 108, based upon the wireless region and account information. Message 50 is converted to Network Paging Protocol and transmitted via a wireless service provider. Then, in a step 528, a confirmation message is sent over the public packet switched network to the user in order to confirm that a merchant will contact the user in order to complete a commercial transaction in the product or service of interest.

Intelligent Notification Distribution

Some embodiments can also include the capability to identify a group of wireless terminals distributed to the same organization. To prevent the same vendor notification from being displayed on every terminal, messages are distributed among the terminals in the group using a round robin selection scheme. This enables the transmission of vendor notifications to a subset, including only one terminal, of the group of terminals.

Embodiments can provide a delay in the transmission of vendor notification to terminals deemed non-priority. This enables priority terminals to receive sales leads in advance of the non-priority terminals. The length of delay time can be selected to provide varied levels of priority service.

Some embodiments can also include the capability to screen terminals based upon one or many established criteria. Only terminals that meet specific criteria can receive vendor notifications. Embodiments can halt the distribution and transmission of those purchase requests that meet the established criteria in order to achieve the screening. Embodiments can also include the step of storing vendor notifications for transmission to the wireless service provider at a later time. This enables vendor notifications received in the evening to be transmitted the next business morning.

Embodiments can also automatically send a report by email and/or facsimile, via optional facsimile machine 106 in FIG. 1, to each vendor. The report reflects the number of vendor notifications sent to the vendor for a given period of time, for example throughout the day.

Modem Backup

Select embodiments can provide the ability to have a plurality of modems for backup transmission of messages to the wireless service provider. In these embodiments, the dedicated connection to the wireless provider is sensed to detect a lost connection condition or an insufficient transmission throughput condition. If either of these conditions is present, one or more backup modems is switched in to continue transmission. Then, a scan for an available modem is performed based upon an expiration of a predetermined amount of requests have been queued. The system waits for an available modem if one is not immediately available.

Contact Management Integration

Embodiments can include the capability to access the customer database in order to product reports containing purchaser information. Further, access to accounting functions enables many embodiments according to the invention to provide financial information in reports.

Many embodiments also include logging transaction information recorded in a database to enable tracking of requests based upon client identity. The customer database can reflect the time of requests and number of requests sent by each client. Further, the number of requests made for individual products and services can be determined. Reports indicating the volume of requests sent to individual cites and states or at different times of the day, week and month can be generated.

Access Control

Access to private system administration is secured using controls restricting access to an administration interface. Access to log reports and transactional data may be had through reports generated by the contact management software connected to the customer database. Embodiments can possess a graphical user interface accessible by a web browser in order to provide real time reporting in color graphic charts and diagrams.

CONCLUSION

In the foregoing specification, the invention has been described with reference to a specific exemplary embodiments thereof. Many changes or modifications are readily envisioned. For example, changing the specific information tracked or the architecture of the databases associated with the vendor computer, changing the manner in which messages flow from vendor computer to client computers and wireless service provider, adding audio effects to user interfaces, etc., among other changes, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. An apparatus for providing real-time notification of purchaser requirements in a heterogeneous network environment, said heterogeneous network environment comprising a first network and a second network, said first network in communication with a plurality of client computers, said second network being a wireless network in communication with a plurality of wireless terminals, said apparatus comprising:

at least one vendor computer, said vendor computer comprising a product database having information about a plurality of products;

wherein said client computers and said vendor computer being interconnected by said first network such that one of said client computer is operatively disposed to present to a user a plurality of product options and services from which said user can make a selection and thereupon, responsive to a user input indicating a particular product, provide product information retrieved from said product database, and thereupon to receive from said user a selection and to prompt said user for user specific information, and thereupon to cause a purchase request to be transmitted to said vendor computer over said first network;

wherein said at least one vendor computer is operatively disposed to analyze said purchase request to determine product and proximity information of said user;

wherein said at least one vendor computer is operatively disposed, based upon said proximity information, to select from said product database a plurality of selected vendors, each of said vendors being proximate to said user; and wherein said at least one vendor computer is operatively disposed to transmit a message into said wireless network in order to provide said real-time notification of purchaser requirements to said plurality of selected vendors.

2. The apparatus of claim 1 wherein said vendor computer is further operative to distribute said purchase request to said plurality of selected vendors using a round robin selection mechanism to prevent multiplicity of responses.

3. The apparatus of claim 1 wherein said vendor computer is further operative to provide a delay in transmitting said purchase requests to a select subset of said plurality of selected vendors in order to create levels of merchant priority.

4. The apparatus of claim 1 wherein said vendor computer is further operative to screen said plurality of vendors for compliance to specified criteria.

5. The apparatus of claim 1 wherein said vendor computer is further operative to provide to said plurality of vendors a report reflecting a number of purchase requests forwarded to each of said plurality of vendors during a selectable time period.

6. The apparatus of claim 1 wherein said vendor computer is further operative to provide a questionnaire reflecting users' comments about products and services offered.

7. The apparatus of claim 1 wherein said vendor computer is further operative to program said plurality of wireless terminals to configure said wireless terminal.

8. The apparatus of claim 1 wherein said product comprises automobiles.

9. The apparatus of claim 8 wherein said product information comprises a make, model and a description of said automobiles.

10. The apparatus of claim 1 wherein said first network is a public packet switched network.

11. The apparatus of claim 10 wherein said first network is the Internet.

12. The apparatus of claim 1 wherein vendor computer further comprises a customer database having information about a plurality of customers.

13. The apparatus of claim 1 wherein said products are services.

14. The apparatus of claim 1 wherein said one of said client computer provides said user with a menu from which said user makes said selection.

15. The apparatus of claim 1 wherein said product information comprises a picture.

16. The apparatus of claim 1 wherein said product information comprises a photograph.

17. The apparatus of claim 1 wherein said at least one vendor computer is operatively disposed to determine a wireless region associated with each of said plurality of selected vendors.

18. The apparatus of claim 1 wherein said at least one vendor computer is operatively disposed to determine account information associated with each of said plurality of selected vendors.

19. The apparatus of claim 1 wherein said at least one vendor computer is operatively disposed to send a confirmation message over said first network for display to said user, said confirmation message indicating that at least one of said plurality of selected vendors will contact said user in order to enter into a commercial transaction.

20. A method for providing real-time notification of purchaser requirements in a heterogeneous network environment, said heterogeneous network environment having a first network and a second, wireless network, said heterogeneous network environment comprising:

a plurality of wireless terminals in communication with said wireless network to receive said real-time notification of purchaser requirements;

at least one vendor computer, said vendor computer comprising a product database having information about a plurality of products; and a plurality of client computers, said client computers and said computer being interconnected by said first network;

said method comprising:

presenting to a user a plurality of products from which said user can make a selection and thereupon, responsive to a user input indicating a particular product, provide product information retrieved from said product database, and thereupon to receive from said user a selection and to prompt said user for user specific information, and thereupon to cause a purchase request to be transmitted to said vendor computer over said first network;

analyzing said purchase request to determine product and proximity information of said user, thereupon, based upon said proximity information, to select from said product database a plurality of selected vendors, each of said vendors being proximate to said user; and transmitting a message into said wireless network, in order to provide said real-time notification of purchaser requirements to said plurality of selected vendors.

21. The method of claim 20 further comprising:

distributing said purchase request to said plurality of selected vendors using a round robin selection mechanism to prevent multiplicity of responses.

22. The method of claim 20 further comprising:

providing a delay in transmitting said purchase requests to a select subset of said plurality of selected vendors in order to create levels of merchant priority.

23. The method of claim 20 further comprising:

screening said plurality of vendors for compliance to specified criteria.

24. The method of claim 20 further comprising:

providing to said plurality of vendors a report reflecting a number of purchase requests forwarded to each of said plurality of vendors during a selectable time period.

25. The method of claim 20 further comprising:
providing a questionnaire reflecting users' comments about products and services offered.

26. The method of claim 20 further comprising:
programming said plurality of wireless terminals to configure said wireless terminal.

27. The method of claim 20 wherein said product comprises automobiles.

28. The method of claim 20 wherein said product information comprises a make, model and a description of said automobiles.

29. The method of claim 20 wherein said first network is a public packet switched network.

30. The method of claim 29 wherein said first network is the Internet.

31. The method of claim 20 wherein said vendor computer further comprises a customer database having information about a plurality of customers.

32. The method of claim 20 wherein said products are services.

33. The method of claim 20 wherein said presenting step comprises:

providing said user with a menu from which said user makes said selection.

34. The method of claim 20 wherein said product information comprises a picture.

35. The method of claim 20 wherein said product information comprises a photograph.

36. The method of claim 20 further comprising:
determining a wireless region associated with each of said plurality of selected vendors.

37. The method of claim 20 further comprising:
determining account information associated with each of said plurality of selected vendors.

38. The method of claim 20 further comprising:
sending a confirmation message over said first network for display to said user, said confirmation message indicating that at least one of said plurality of selected vendors will contact said user in order to enter into a commercial transaction.

* * * * *